Patented Sept. 26, 1939

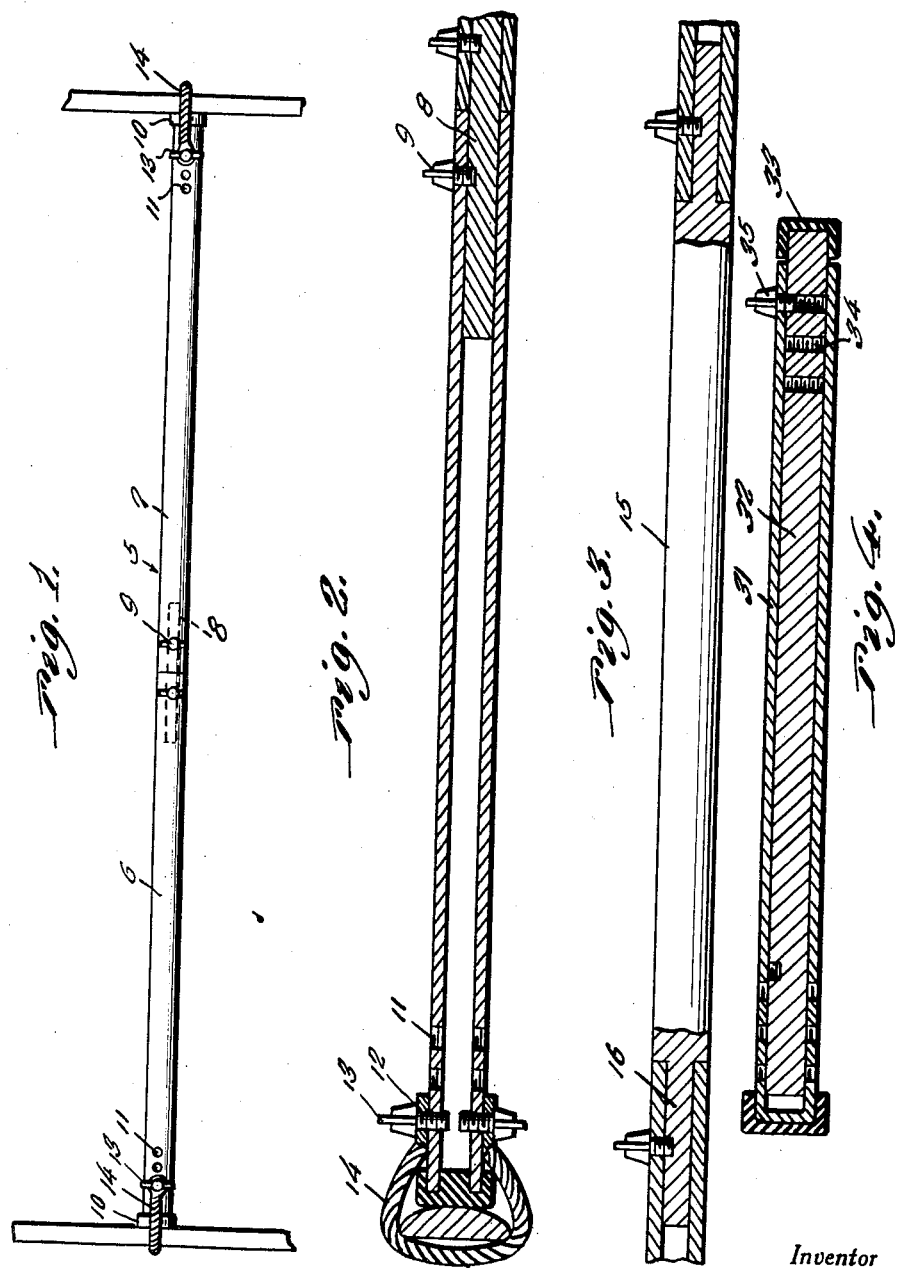

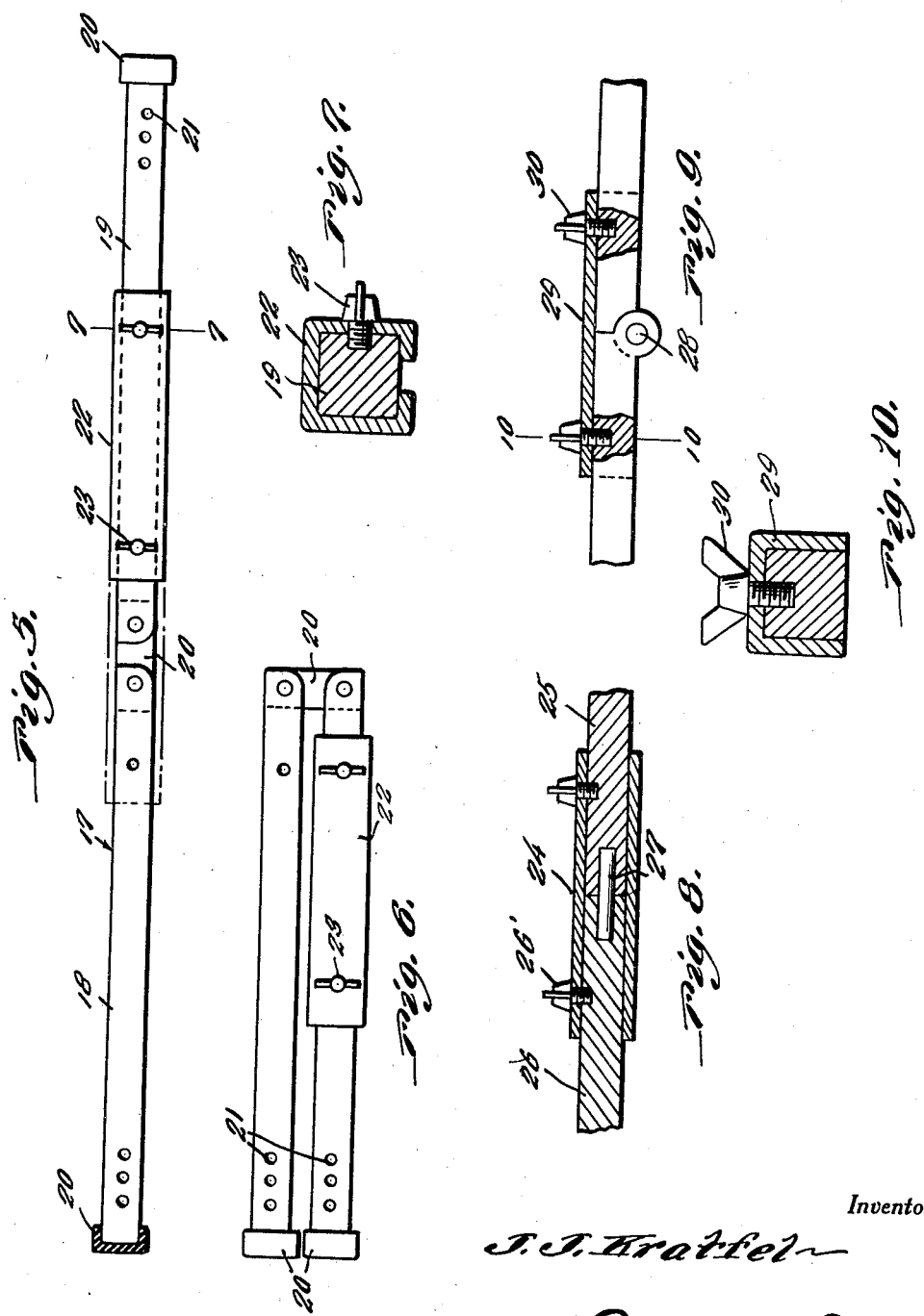

2,174,468

UNITED STATES PATENT OFFICE 2,174,468

TOWING DEVICE

John Joseph Kratfel, Philadelphia, Pa.

Application August 8, 1938, Serial No. 223,735

1 Claim. (Cl. 280—33.14)

This invention relates to a towing device and has for the primary object the provision of a device of this character which will couple vehicles together whereby one of said vehicles may tow the other vehicle without slack occurring in the towing device, so that the vehicles may start and stop smoothly and when in the act of towing will maintain the vehicles properly spaced from each other to permit the vehicles to be easily and safely handled, the construction of the device being such, that the device may be quickly collapsed for storage within a small space in a vehicle.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a towing device constructed in accordance with my invention.

Figure 2 is a fragmentary longitudinal sectional view drawn on an enlarged scale illustrating the means of detachably securing the towing device onto a vehicle.

Figure 3 is a fragmentary side elevation, partly in section, illustrating a modified form of my invention.

Figure 4 is a vertical sectional view illustrating another modified form of my invention.

Figure 5 is a side elevation, partly in section, illustrating another modified form of my invention.

Figure 6 is a side elevation illustrating the form of the invention shown in Figure 5 in a folded position.

Figure 7 is a transverse sectional view taken on line 7—7 of Figure 5.

Figure 8 is a fragmentary vertical sectional view illustrating another modified form of my invention.

Figure 9 is a side elevation partly in section illustrating another modification of my invention.

Figure 10 is a sectional view taken on line 10—10 of Figure 9.

Referring in detail to the drawings, the numeral 5 indicates a towing bar composed of sections 6 and 7 arranged in endwise relation and are provided in their adjacent ends with sockets to receive a coupling pin 8 held in position by set screws 9. The set screws 9 permit the pin 8 to be freed whenever it is desired to separate the sections 6 and 7 of the towing bar 5.

The other ends of the sections 6 and 7 of the bar are provided with cushion heads 10 to engage with parts of vehicles to be coupled by the device, as clearly shown in Figure 1. The cushion heads prevent the device from marring or damaging the finish of the vehicles.

Adjacent the cushion heads 10 the sections 6 and 7 are provided with pairs of opposed screw threaded openings 11 in which are threaded bolts 12 having wing-shaped heads 13. The bolts 12 are employed for detachably connecting to the bar 5 or the sections 6 and 7 thereof tie elements 14, each constructed of a braided metallic material having flattened apertured ends to receive the bolts 12. The flexible elements 14 are passed about some selected part of two vehicles and secured to the sections 6 and 7 of the bar 5 by the bolts 12, bringing the cushion heads 10 into engagement with the parts of the vehicles. Thus a substantially rigid connection is provided between the two vehicles so that one may tow the other without any undue slack between the vehicles, permitting said vehicles to be easily handled either when moving forwardly or backwardly.

The sections 6 and 7 of the bar 5 may be tubular or rectangular in cross section, as shown in Figures 1 and 2.

If desired, the coupling bar 5 may be composed of an intermediate section 15 having reduced ends 16 fitting in the section 7 and held therein by the set screws 9, consequently rendering the towing bar 5 of an increased length. The sections of the towing bar may be readily separated when desiring to store the device in a small or limited space within a vehicle.

Referring to my modified form of invention as shown in Figures 5 and 6, the towing device or bar is indicated in entirety by the numeral 17 and consists of sections 18 and 19 connected together by a hinge link 20. The free ends of the sections 18 and 19 have the cushion heads 20' and are provided with screw threaded openings 21 adjacent the cushion heads for receiving the bolts 12 for securing to the sections the connecting elements 14.

A sleeve 22 is slidable on the bar 17 and is adapted to be positioned over the adjacent ends of the sections 18 and 19 and the hinge link 20 to prevent said sections from hinging relative to each other and maintaining the device in position for towing one vehicle by another. Set screws 23 are carried by the sleeve 22 and may be turned in engagement with the sections for securing the sleeve against sliding movement. The sleeve may be secured either to hold the sections 18 and 19 in endwise relation or may be positioned on one of the sections to permit the sections 18 and 19 to be folded one on the other, as shown in Figure 6, so that the device can be conveniently carried within a limited space. The cross sectional shape of the sections 18 and 19 may be varied and the cross sectional shape of the sleeve 22 matches the shape of the sections 18 and 19.

As shown in Figure 8, a sleeve 24 may be employed for joining sections 25 and 26 of a towing device together through the use of set screws 26′ carried by the sleeve and turned into screw threaded sockets formed in the sections 25 and 26. A pin 27 may fit in sockets formed in the adjacent ends of the sections 25 and 26.

Instead of employing the type of hinge, as shown in Figures 5 and 6, the sections 18 and 19 may be connected by a ruler type hinge 28 and held against hinging movement by a sleeve 29 carrying set screws 30 threaded into sockets of the hinge sections of the device.

In any of the forms of my invention shown and described, the device can be readily shortened so that it can be conveniently stored away in a comparatively small space within a motor vehicle so as to be handy when needed. Further it will be seen from the present showing that the device can be readily brought into an operative position and quickly connected with vehicles so that one vehicle can tow the other with a substantially rigid connection between said vehicles.

In the form of my invention shown in Figure 4, the towing device consists of telescopic sections 31 and 32, each section having a cushion head 33 secured to its free end. The sections 31 and 32 are provided with screw threaded openings 34 to receive set screws 35. The set screws 35 also extend through openings in the other sections. Through the adjustment of the set screws 35 to the various openings of the sections the latter may be extended to provide a device of different lengths and permit the sections to be readily secured against accidental sliding movement relative to each other.

It is believed that the foregoing description, when taken in connection with the drawings, will fully set forth the construction and advantages of this invention to those skilled in the art to which such a device relates, so that further detailed description will not be required.

Having thus described my invention, what I claim is:

A towing device comprising rigid tubular end sections and a rigid cylindrical intermediate section having reduced ends frictionally fitting in adjacent ends of the end sections, fasteners detachably connecting the end sections to the intermediate section, cushion heads capping the other ends of said end sections, said end sections having pairs of screw threaded openings arranged adjacent the heads, flexible elements adapted to pass about parts of vehicles and having eyes in the ends thereof to be brought opposite selected pairs of openings of the end sections, and set screws passing through the eyes and threaded in the openings aligning with the eyes to secure the flexible elements about the parts of the vehicles with the heads in contact with said parts of the vehicles.

JOHN JOSEPH KRATFEL.